UNITED STATES PATENT OFFICE.

JAMES HENDERSON, OF BELLEFONTE, PENNSYLVANIA, ASSIGNOR TO CHARLES G. FRANCKLYN, OF NEW YORK, N. Y.

COMPOUND FOR FIRE-BRICK, FURNACE-LININGS, &c.

SPECIFICATION forming part of Letters Patent No. 265,961, dated October 17, 1882.

Application filed April 6, 1882. (No specimens.)

*To all whom it may concern:*

Be it known that I, JAMES HENDERSON, of the borough of Bellefonte, county of Centre, State of Pennsylvania, (formerly of New York city, New York,) have invented a new and useful Compound for Fire-Brick, Furnace-Linings, and Similar Purposes, of which the following is such full, clear, and exact description as will enable others skilled in the art to which this my invention most nearly appertains to make and use the same.

Heretofore and before this my invention great difficulty has been found in making a fire-brick or lining for furnaces, converters, and other vessels used in the manufacture of iron and steel which would properly withstand the intense heat to which they are subjected.

The products from starch known as "glucose," "dextrine," or "grape-sugar," I have discovered, will, when mixed with water and compounded with lime, magnesian lime, magnesian limestone, carbonate of lime, magnesia, carbonate of magnesia, or any two or more of them, whether fluor-spar, artificial fluoride of calcium, or cryolite are added or not, cause the compound to form or set into an extremely hard mass. The glucose, dextrine, or grape-sugar is mixed with water in the proportion of one part glucose and one to twenty parts water, by bulk. Instead of glucose, molasses may be added to the water in like proportions with good results. The liquid made by this mixture is compounded with lime or magnesian lime, or some one or more of the substances above set forth, which must be ground to a fine powder before mixing, so that it will pass through a sieve of two thousand five hundred meshes to the square inch.

When the compound is made in the proper proportions it makes a mastic, which may be applied in that form as a lining to a furnace, converter, or other vessel, where it should be allowed to dry and harden, either by the natural drying of the atmosphere, or it may be dried by artificial means. If cracks appear during or after the drying, they should be filled with the compound to close them, and all cracks should be carefully closed before the linings are used in the manufacture of iron or steel.

The compound may be pressed into brick in molds and allowed to dry in the air, or may be dried in kilns; or, if preferred, they may be dried in the molds in a kiln at a high temperature. The molds I prefer are made of steel and sufficiently strong and heavy to stand the action of the kilns in which they are heated in drying the bricks.

I will now state some of the proportions which I have found to give good results, but do not wish to confine my invention to the exact proportions here given, as they may be varied without departing from my invention.

First, glucose, dextrine, grape-sugar, or molasses, one part; water, four parts, by bulk, mixed with fluor-spar, ten (10) per cent., and magnesian lime, ninety (90) per cent., by weight, in such proportion as to make a plastic compound, which will be found particularly well adapted for lining furnaces, converters, and other vessels; second, glucose, dextrine, &c., one (1) part, and water, nine (9) parts, by bulk, and magnesian lime, or magnesian limestone, or carbonate of lime, or magnesia, or carbonate of magnesia, or any two or more of these, in any proportion to one another, if mixed, made into a plastic compound, which may be used as a lining or molded into brick; third, glucose, dextrine, &c., one (1) part, and water, nine (9) parts, by bulk, and magnesian lime, magnesian limestone, carbonate of lime, magnesia, carbonate of magnesia, or any two or more of these, fifty (50) to ninety (90) per cent., by weight, with fluor-spar, artificial fluoride of calcium, or cryolite, ten (10) to fifty (50) per cent., by weight, the liquid being added to the solid ingredients in such proportion as will make the compound of the desired stiffness or plastic condition.

The compounds should be more plastic or thin when they are to be used as a plaster for making a lining in the furnace, converter, or other vessel than when they are molded into bricks. When bricks are made it is found preferable to have only a small amount of the liquid added to the compound, as they more readily become set and hard and less drying is required. I have found that the glucose in the compound makes a less amount of fluor-spar necessary in the compounds where fluor-spar forms an ingredient than is required to give an equally good lining when glucose or some of its stated equivalents are not used. The proportion of fluor-spar to lime, magnesian lime, magnesian limestone, or whatever substance is mixed with it is determined according to the temperature to which the lining is to be subjected in use. Where intense temperatures—such as are had when wrought-iron is treated—the less fluor-spar used, which will at the same time give the binding property to the compound, the better the lining will withstand the heat. Greater proportions of fluor-spar may be used where merely cast-iron is to be melted or where a temperature lower than is required for melting cast-iron.

The advantage of using more fluor-spar with lower temperatures is that the lining is more easily made, being less liable to crack.

I do not wish to be understood as claiming in this application the use of fluor-spar with carbonate of lime or carbonate of lime and magnesia in about equal proportions, where the product or material to be treated is wrought-iron or steel, as these proportions used at temperatures of melting wrought-iron become fusible, and are suitable merely as reagents for purifying the metal, and have been before described.

I am aware that aqueous saccharine solutions of litharge, lime, and other materials have been heretofore used for forming artificial stone and other purposes, and do not claim the same; but

What I claim as new, and desire to secure by Letters Patent, is—

1. The compound consisting of water and glucose and lime as a lining for furnaces, converters, and other vessels for the manufacture of iron and steel, as specified and set forth.

2. The compound consisting of glucose and water and magnesian lime and fluor-spar as a lining for furnaces, converters, and other vessels for the manufacture of iron and steel, as specified.

JAMES HENDERSON.

Witnesses:
E. M. BLANCHARD,
S. S. LYON.